(12) United States Patent
Ginzburg et al.

(10) Patent No.: US 9,891,980 B2
(45) Date of Patent: Feb. 13, 2018

(54) AGGREGATED PAGE FAULT SIGNALING AND HANDLINE

(75) Inventors: Boris Ginzburg, Haifa (IL); Ronny Ronen, Haifa (IL); Ilya Osadchiy, Haifa (IL)

(73) Assignee: Intel Corporation, Santa Clara, CA (US)

( * ) Notice: Subject to any disclaimer, the term of this patent is extended or adjusted under 35 U.S.C. 154(b) by 281 days.

(21) Appl. No.: 13/977,106

(22) PCT Filed: Dec. 29, 2011

(86) PCT No.: PCT/US2011/067723
§ 371 (c)(1),
(2), (4) Date: Jun. 28, 2013

(87) PCT Pub. No.: WO2013/101020
PCT Pub. Date: Jul. 4, 2013

(65) Prior Publication Data
US 2014/0304559 A1    Oct. 9, 2014

(51) Int. Cl.
*G06F 11/07* (2006.01)
*G06F 9/30* (2006.01)
*G06F 12/08* (2016.01)

(52) U.S. Cl.
CPC ...... *G06F 11/0784* (2013.01); *G06F 9/30036* (2013.01); *G06F 9/30043* (2013.01); *G06F 12/08* (2013.01)

(58) Field of Classification Search
None
See application file for complete search history.

(56) References Cited

U.S. PATENT DOCUMENTS 5,664,159 A    9/1997  Richter et al.
5,895,501 A *  4/1999  Smith ........................... 711/207
(Continued)

FOREIGN PATENT DOCUMENTS

CN    101364253 A    2/2009
TW       305959 B    5/1997
(Continued)

OTHER PUBLICATIONS

Office Action received for Taiwan Patent Application No. 101149827, dated Dec. 1, 2014, 4 pages of Taiwan Office Action and 1 pages of English Search Report.
(Continued)

*Primary Examiner* — Daniel Tsui
*Assistant Examiner* — William E Baughman
(74) *Attorney, Agent, or Firm* — Vecchia Patent Agent, LLC

(57) ABSTRACT

A processor of an aspect includes an instruction pipeline to process a multiple memory address instruction that indicates multiple memory addresses. The processor also includes multiple page fault aggregation logic coupled with the instruction pipeline. The multiple page fault aggregation logic is to aggregate page fault information for multiple page faults that are each associated with one of the multiple memory addresses of the instruction. The multiple page fault aggregation logic is to provide the aggregated page fault information to a page fault communication interface. Other processors, apparatus, methods, and systems are also disclosed.

27 Claims, 16 Drawing Sheets

(56) References Cited

U.S. PATENT DOCUMENTS

| | | | |
|---|---|---|---|
| 7,746,099 | B1 | 6/2010 | Chan et al. |
| 7,984,273 | B2 | 7/2011 | Sprangle et al. |
| 8,850,121 | B1 * | 9/2014 | Ashcraft et al. ............ 711/125 |
| 2005/0091569 | A1 | 4/2005 | Chao |
| 2007/0294496 | A1 * | 12/2007 | Goss et al. ................. 711/163 |
| 2008/0104362 | A1 | 5/2008 | Buros et al. |
| 2009/0172364 | A1 * | 7/2009 | Sprangle et al. ............ 712/225 |
| 2009/0210774 | A1 | 8/2009 | Benoit et al. |
| 2009/0300267 | A1 * | 12/2009 | Schneider ................... 711/100 |
| 2011/0153983 | A1 | 6/2011 | Hughes et al. |

FOREIGN PATENT DOCUMENTS

| | | |
|---|---|---|
| TW | 544575 B | 8/2003 |
| WO | WO-2006-123351 A1 | 11/2006 |
| WO | 2013/101020 A1 | 7/2013 |

OTHER PUBLICATIONS

International Preliminary Report on Patentability and Written Opinion received for PCT Patent Application No. PCT/US2011/067723, dated Jul. 10, 2014, 6 Pages.

"Notification of Transmittal of the International Search Report and the Written Opinion of the International Searching Authority, or the Declaration" dated Dec. 28, 2012 pp. 9, in PCT/US2011/067723.

Extended European Search report received for European Patent Application No. 11878938.7, dated Jul. 28, 2015, 7 pages.

Office Action received for Chinese Patent Application No. 201180076471.5, dated Apr. 22, 2016, 12 pages of Chinese Office Action.

Office Action received for Chinese Patent Application No. 201180076471.5, dated Mar. 2, 2017, 11 pages of Chinese Office Action only.

* cited by examiner

METHOD IN A PAGE FAULT HANDLER MODULE FOR RESOLVING A MULTI-PAGE PAGE FAULT

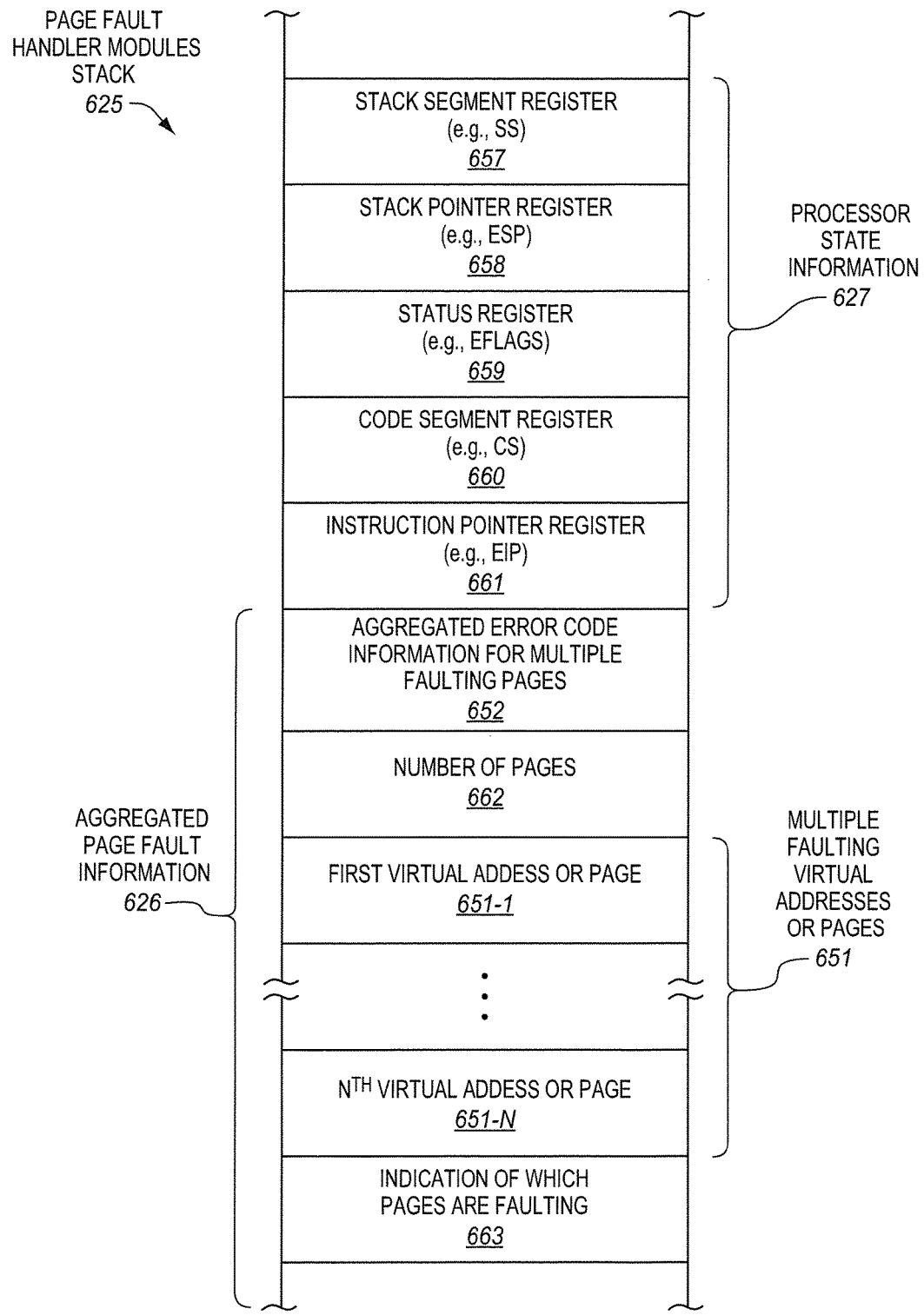

| bit | name |
|---|---|
| 0 | P-1 |
| 1 | W/R |
| 2 | U/S |
| 3 | RSVD-1 |
| 4 | I/D |
| 5 | AG |
| 6 | P-2 |
| 7 | RSVD-2 |
| 8 | P-3 |
| 9 | RSVD-3 |
| ... | ... |
| q | P-N |
| q+1 | RSVD-N |
| ... | RESERVED |
| m-1 | |

P-N
- 0 THE FAULT FOR PAGE N WAS CAUSED BY A NON-PRESENT PAGE
- 1 THE FAULT FOR PAGE N WAS CAUSED BY A PAGE LEVEL PROTECTION VIOLATION

W/R/S
- 0 THE ACCESS CAUSING THE FAULT WAS A READ
- 1 THE ACCESS CAUSING THE FAULT WAS A WRITE

- 0 THE ACCESS CAUSING THE FAULT ORIGINATED WHEN THE PROCESSOR WAS EXECUTING IN SUPERVISOR MODE
- 1 THE ACCESS CAUSING THE FAULT ORIGINATED WHEN THE PROCESSOR WAS EXECUTING IN USER MODE

RSVD-N
- 0 THE FAULT FOR PAGE N WAS NOT CAUSED BY RESERVED BIT VIOLATION
- 1 THE FAULT FOR PAGE N WAS CAUSED BY A RESERVED BIT SET TO 1 IN SOME PAGE-STRUCTURE ENTRY

I/D
- 0 THE FAULT WAS NOT CAUSED BY AN INSTRUCTION FETCH
- 1 THE FAULT WAS CAUSED BY AN INSTRUCTION FETCH

AG
- 0 NON-AGGREGATING PAGE FAULT PROCEDURE
- 1 AGGREGATING PAGE FAULT PROCEDURE

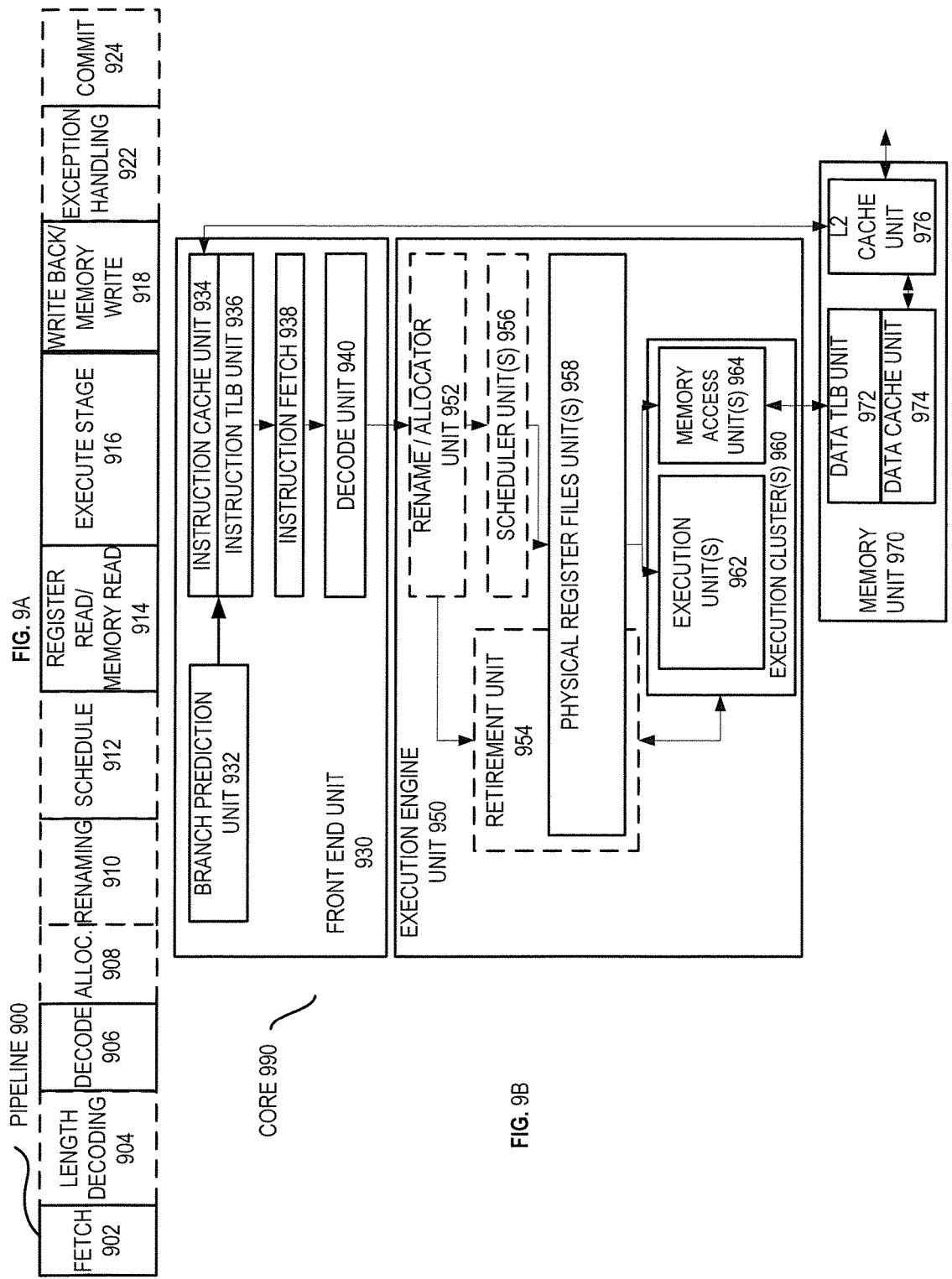

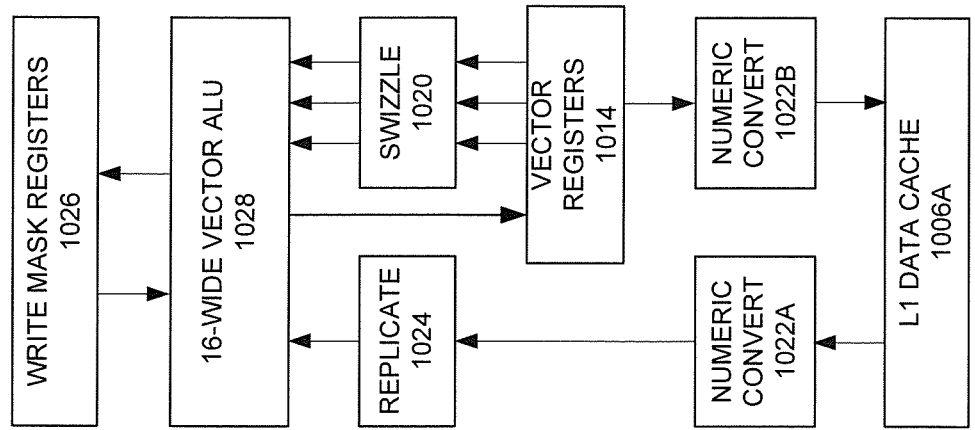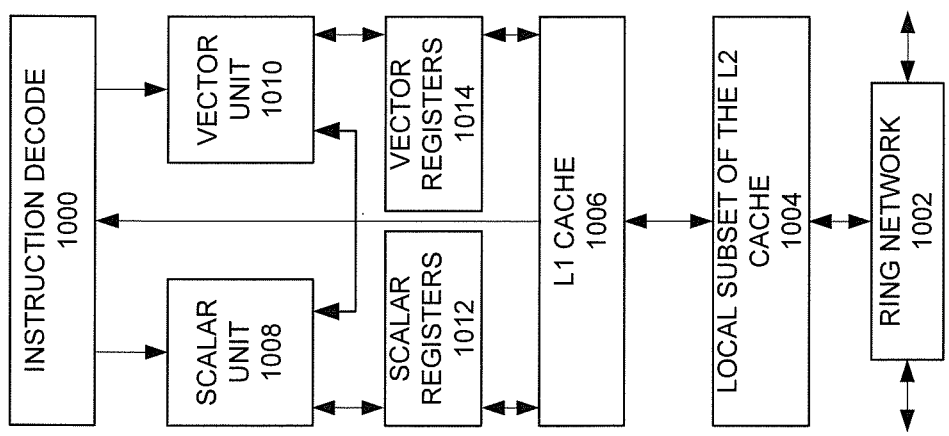

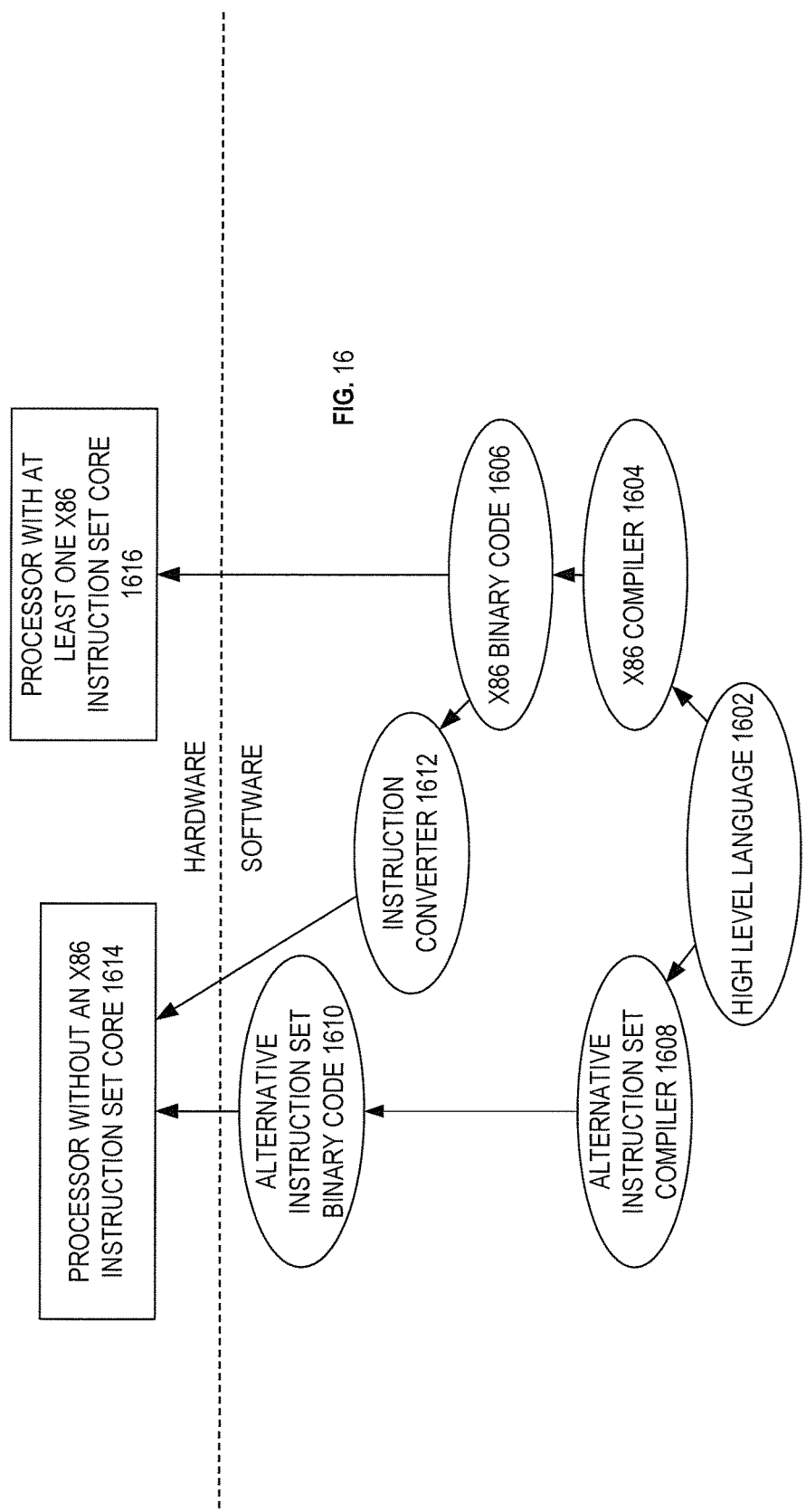

AGGREGATED PAGE FAULT SIGNALING AND HANDLINE

CROSS-REFERENCE TO RELATED APPLICATION

This patent application is a U.S. National Phase Application under 35 U.S.C. § 371 of International Application No. PCT/US2011/067723, filed Dec. 29, 2011, entitled AGGREGATED PAGE FAULT SIGNALING AND HANDLINE.

BACKGROUND

Field

Embodiments relate to computer architectures. In particular, embodiments relate page faults in computer architectures.

Background Information

Processors commonly execute instructions that access (e.g., read from and/or write to) memory. For example, the instructions may have memory operands that provided addresses of memory locations. A virtual memory management scheme is commonly used in which the instructions indicate virtual or logical memory addresses, which are translated into physical addresses used to access locations in the main memory. Paging is commonly used as a memory-management scheme. Paging organizes the memory into pages. The pages may represent fixed or variable sized blocks or sections of the memory that are handled as individual entities. Accordingly, accesses by the instructions to the memory operands may represent accesses to pages. An advantage of paging is that it allows data to be stored in secondary storage (e.g., a hard disk) and retrieved into main memory when needed.

A page fault may occur when an instruction attempts to access a page that is missing from main memory. For example, the instruction may indicate a virtual address that cannot be mapped to a physical address associated with the page. A page fault may also occur when the access attempted by the instruction is considered impermissible. This may occur, for example, when the instruction attempts to write to a page that is read only. The page fault may effectively represent a fault, interrupt, exception, or trap raised or signaled by hardware (e.g., a processor and/or a memory management unit (MMU)), to software (e.g., an operating system and/or a page fault handler). In response to the page fault, the software (e.g., the page fault handler) may attempt to handle the page fault prior to returning from the page fault back to the processor. Such page faults tend to take a significant amount of time to resolve, tend to reduce performance, and are generally undesirable.

Some instructions have multiple memory operands and attempt to access multiple memory locations. As an example, Intel® Advanced Vector Extensions Programming Reference, document reference number 319433-011, published June 2011, describes several VGATHER instructions (e.g., VGATHERDPD, VGATHERQPD, VGATHERDPS, VGATHERQPS, VPGATHERDD, VPGATHERQD, VPGATHERDQ, and VPGATHERQQ). The VGATHER instructions are used to gather or load multiple values from memory using memory addresses derived from a vector of indexes. By way of example, VPGATHERDD/VPGATHERQD is able to gather up to up to 4 or 8 values from memory. Other instructions that have two or more memory operands and attempt to access two or more memory locations are known in the art.

FIG. 1 is a block diagram illustrating an example gather operation 100 that may be performed responsive to a VGATHER instruction 101 that specifies multiple memory addresses 102 of multiple corresponding pages 103 in memory 104. The VGATHER operation gathers or loads eight values from eight pages using eight corresponding memory addresses specified by the VGATHER instruction and stores them in result packed data 104. For example, a first memory address 0 102-0 corresponds to a first page 0 103-0, a second memory address 1 102-1 corresponds to a second page 1 103-1, and so on. Accordingly, the VGATHER instruction potentially attempts to simultaneously access up to eight different pages. Such a VGATHER instruction/operation may be used, for example, when transposing a large matrix, or otherwise accessing sparse memory locations.

A significant problem may occur when two or more, or worse all eight, of the pages indicated by the VGATHER instruction are missing from the memory and/or when the accesses to the pages are impermissible. In particular, execution of the VGATHER instruction may involve two or more, or worse potentially eight, sequential page faults. The current page fault mechanism for VGATHER is sequential, with right-to-left address ordering of the page faults. For example, if during the execution of the VGATHER instruction, the pages corresponding to memory address 0, memory address 2, and memory address 7 are not present in physical memory, then a first page fault may be raised for memory address 0. After the first page fault has been resolved, execution of the VGATHER instruction may be restarted and a second page fault may be raised for memory address 2. After the second page fault has been resolved, execution of the VGATHER instruction may be restarted and a third page fault may be raised for memory address 7. In some cases, up to eight sequential page faults may be raised for such a VGATHER instruction. Similarly, various other instructions may specify two or more memory addresses which may potentially lead to two or more sequential page faults being raised.

Sequential resolution of such page faults may tend to take a significant amount of time to resolve, tend to reduce performance, and is generally undesirable.

BRIEF DESCRIPTION OF THE SEVERAL VIEWS OF THE DRAWINGS

The invention may best be understood by referring to the following description and accompanying drawings that are used to illustrate embodiments. In the drawings:

FIG. 6 is a block diagram of a particular example embodiment of a page fault handler modules stack having aggregated page fault information and processor state information.

FIG. 7 is a block diagram of a particular example embodiment of a suitable aggregated error code for multiple faulting pages.

FIG. 9A is a block diagram illustrating both an exemplary in-order pipeline and an exemplary register renaming, out-of-order issue/execution pipeline according to embodiments of the invention.

FIG. 9B is a block diagram illustrating both an exemplary embodiment of an in-order architecture core and an exemplary register renaming, out-of-order issue/execution architecture core to be included in a processor according to embodiments of the invention.

FIGS. 10A-B illustrate a block diagram of a more specific exemplary in-order core architecture, which core would be one of several logic blocks (including other cores of the same type and/or different types) in a chip.

FIG. 16 is a block diagram contrasting the use of a software instruction converter to convert binary instructions in a source instruction set to binary instructions in a target instruction set according to embodiments of the invention.

DETAILED DESCRIPTION

In the following description, numerous specific details are set forth (e.g., specific processor configurations, sequences of operations, interfaces, error codes, etc.). However, embodiments may be practiced without these specific details. In other instances, well-known circuits, structures and techniques have not been shown in detail to avoid obscuring the understanding of the description.

Figure 1:
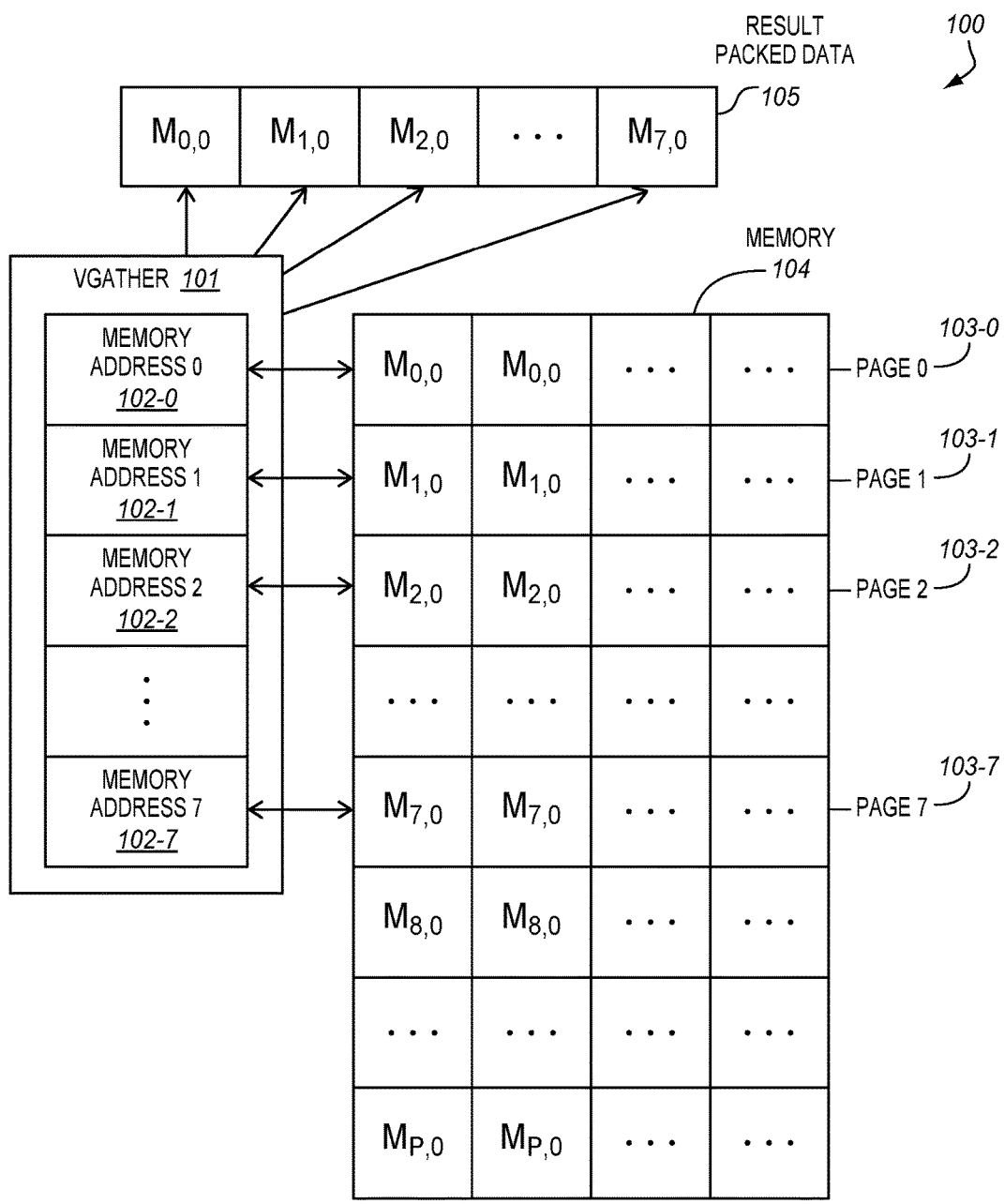
FIG. 1 is a block diagram illustrating an example gather operation that may be performed responsive to a VGATHER instruction that specifies multiple memory addresses of multiple corresponding pages in memory.
Figure 2:
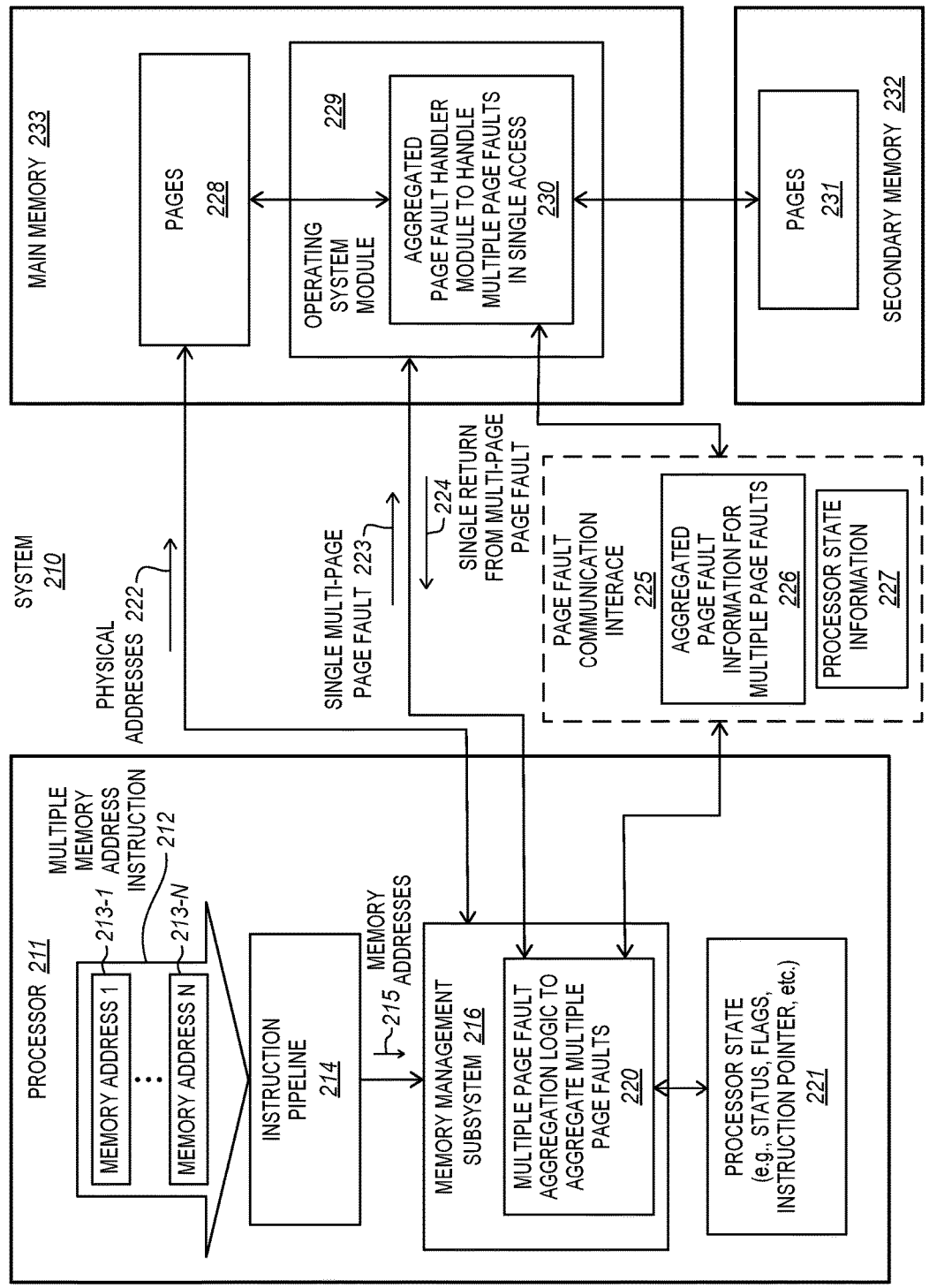
FIG. 2 is a block diagram of an embodiment of a system in which embodiments of the invention may be implemented.

FIG. 2 is a block diagram of an embodiment of a system 210 (e.g., a computer system or other electronic system having one or more processors and memory) in which embodiments of the invention may be implemented. The computer system includes a processor 211, main memory 233, and secondary memory 232. The processor may be any of various complex instruction set computing (CISC) processors, various reduced instruction set computing (RISC) processors, various very long instruction word (VLIW) processors, various hybrids thereof, or other types of processors entirely. In some embodiments, the processor may be a general-purpose processor (e.g., a general-purpose microprocessor of the type used in desktop, laptop, and like computers). Alternatively, the processor may be a special-purpose processor. Examples of suitable special-purpose processors include, but are not limited to, graphics processors, network processors, communications processors, cryptographic processors, co-processors, embedded processors, digital signal processors (DSPs), to name just a few examples.

The processor includes a conventional instruction pipeline 214. Instructions may be provided to the instruction pipeline for execution. In some embodiments, a multiple memory address instruction 212 may be provided to the instruction pipeline for execution. The multiple memory address instruction has multiple memory addresses 213. The memory addresses may represent virtual or logical memory addresses (e.g., linear addresses). As shown, the instruction may have a first memory address 213-1 through an Nth memory address 213-N, where N is at least two. Examples of suitable multiple memory address instructions include, but are not limited to, gather instructions indicating multiple memory addresses, scatter instructions indicating multiple memory locations, and other memory access instructions indicating multiple memory addresses that may each potentially correspond to a different memory page.

Within the instruction pipeline, an effort is made to translate the virtual or logical memory addresses of the multiple memory address instruction into corresponding physical addresses. The memory addresses may be provided to a memory management subsystem 216 of the processor. With a few exceptions relative to aggregated page faults, which will be discussed further below, the memory management subsystem may be substantially conventional and may perform substantially conventional operations to attempt to translate the virtual memory addresses into the corresponding physical addresses.

Different memory management subsystems are known in the art. In some embodiments, the memory management subsystem may include a memory management unit (MMU) and a translation lookaside buffer (TLB). The MMU may represent a hardware component that is used to help attempt to translate the virtual memory addresses indicated by the instruction into physical memory addresses. The MMU may check the TLB to see if a virtual memory address to physical memory address translation is available in the TLB. If the translation is available (i.e., there is a TLB hit), then the physical memory address 222 may be retrieved and used to access the corresponding page 228 in main memory 233. Alternatively, if the translation is not available (i.e., there is a TLB miss), then the MMU may further attempt to translate the virtual memory address by performing a page walk. During the page walk, the MMU may determine whether or not page associated with the virtual memory address is present in memory and may determine whether or not a permission associated with the page allows for the attempted access. If the page is missing, or if the permission does not allow for the attempted access, conventionally a page fault would be raised.

In embodiments of the invention, the memory management subsystem 216 includes multiple page fault aggregation logic 220 that is operable to aggregate multiple page faults. The page faults may represent minor page faults, soft page faults, major page faults, hard page faults, invalid page faults, or combinations thereof. The multiple page fault aggregation logic is operable to store or provide aggregated page fault information 226 for multiple page faults to a page fault communication interface 225. In some embodiments, the multiple page fault aggregation logic may be operable to aggregate all of the page faults for all of the memory addresses of the multiple memory address instruction 212, although this is not required. In other embodiments, the multiple page fault aggregation logic may be operable to aggregate a subset of two or more page faults for a subset of two or more of the memory addresses of the multiple memory address instruction. Although this may tend to sacrifice some performance, as compared to if all page faults were aggregated, aggregating two or more page faults may have better performance than if no page faults are aggregated and may be suitable for some implementations. Depending upon the implementation, the page fault aggregation logic may work either sequentially (e.g., from a first memory address toward a last memory address of an instruction) or in parallel. As soon as a first page fault is detected the aggregation logic may determine multiple pages indicated by the faulting instruction, and provide the multiple pages as part of the exception raised. The multiple page fault aggregation logic is operable to raise or issue a multi-page page fault 223 corresponding to the multiple aggregated page faults.

The multiple page fault aggregation logic is also operable to store or provide processor state information 227 pertinent to a processor state 221 to the page fault communication interface. The processor state may represent the current state of execution of the processor. Examples of processor state include, but are not limited to, processor status, processor flags, an instruction pointer, and combinations thereof.

The page fault communication interface 225 is an interface used by the processor and the operating system module 229 and/or an aggregated page fault handler module 230 to exchange information about aggregated page faults. In some embodiments, the page fault communication interface may represent one or more predetermined agreed upon architecturally visible storage locations accessible to both the processor and the operating system. Different types of page fault communication interfaces are suitable. Examples of suitable page fault communication interfaces include, but are not limited to, one or more stacks (e.g., a page fault handler modules stack), one or more registers (e.g., one or more control registers or vector control registers), allocated memory locations, memory-mapped input/output memory locations, and combinations thereof. The scope of the invention is not limited to any known type of page fault communication interface as long as the processor and operating system and/or page fault handler modules are aware of the interface and able to access it as needed to convey the appropriate information.

The multiple page fault aggregation logic 220 may be implemented in hardware (e.g., integrated circuitry), firmware, microcode, software, or a combination thereof. In some embodiments, the multiple page fault aggregation logic may be implemented in microcode, embedded firmware, or embedded software of the processor. In some embodiments, the multiple page fault aggregation logic includes at least some hardware (e.g., integrated circuitry, transistors, logic gates, etc.). In some embodiments, the memory management subsystem includes a MMU and the multiple page fault aggregation logic is included in the MMU. In other embodiments, the memory management subsystem includes a MMU and the multiple page fault aggregation logic is separate from the MMU but is coupled with, or otherwise in communication with, the MMU.

Referring again to FIG. 2, an operating system module 229 is stored in the main memory. The illustrated operating system module includes an aggregated page fault handler module 230 that is operable to handle multiple page faults responsive to a single multi-page page fault 223 raised or signaled by the processor. In various embodiments, the aggregated page fault handler module may represent one or more routines, subroutines, modules, sub-modules, software portions, or one or more other portions of the operating system that is operable to handle the multiple page faults in a single access from the processor. The page faults may represent faults, interrupts, exceptions, or traps.

In handling the multiple page faults, the aggregated page fault handler module 230 may read or otherwise access the aggregated page fault information 226 from the page fault communication interface. As will be explained further below, the aggregated page fault information may include information pertinent to the multiple page faults. By way of example, the aggregated page fault information may include multiple memory addresses for faulting pages, information describing the nature of each of the page faults (e.g., error code information specific or pertinent to each of the page faults), etc. The aggregated page fault handler module may potentially bring in multiple missing pages 231 from the secondary memory 232 and store them with the other pages 228 in the main memory. The secondary memory may include one or more hard disks or other mass storage devices. In some cases, the aggregated page fault handler module may potentially change attributes of the pages.

The page fault handler module and/or the operating system may handle, service, or resolve all of the faulty pages in response to a single access from the processor (e.g., the single multi-page page fault). That is, the multiple page faults may be processed together or as a batch or group rather than each being processed sequentially or serially after a separate sequential or serial page fault is raised from the processor. When the multiple page faults have been resolved, a single return from multi-page page fault 224 may be made from the operating system and/or page fault handler module back to the processor. For example, the instruction pointer passed as part of the processor state information may be used to return execution to the multiple memory address instruction, which may then proceed to execute without or at least with reduced risk of a page fault being incurred. Advantageously, by allowing the processor to aggregate the multiple page faults together, and by allowing the operating system to handle the aggregated multiple page faults as a batch or group, the drawbacks associated with serially raising and handling a chain of multiple page faults may be avoided, which may help to significantly improve performance and execution speed.

To avoid obscuring the description, a relatively simple computer system and processor have been shown and described. In other embodiments, the processor may optionally include other well-known components, such as, for example, an instruction fetch unit, an instruction scheduling unit, a branch prediction unit, instruction and data caches, instruction and data translation lookaside buffers, prefetch buffers, microinstruction queues, microinstruction sequencers, bus interface units, second or higher level caches, a retirement unit, a register renaming unit, other components included in processors, and various combinations thereof. Embodiments may have multiple cores, logical processors, or execution engines. An execution unit operable to execute an embodiment of an instruction disclosed herein may be included in at least one, at least two, most, or all of the cores, logical processors, or execution engines. There are literally numerous different combinations and configurations of components in processors, and embodiments are not limited to any particular combination or configuration.

Figure 3:
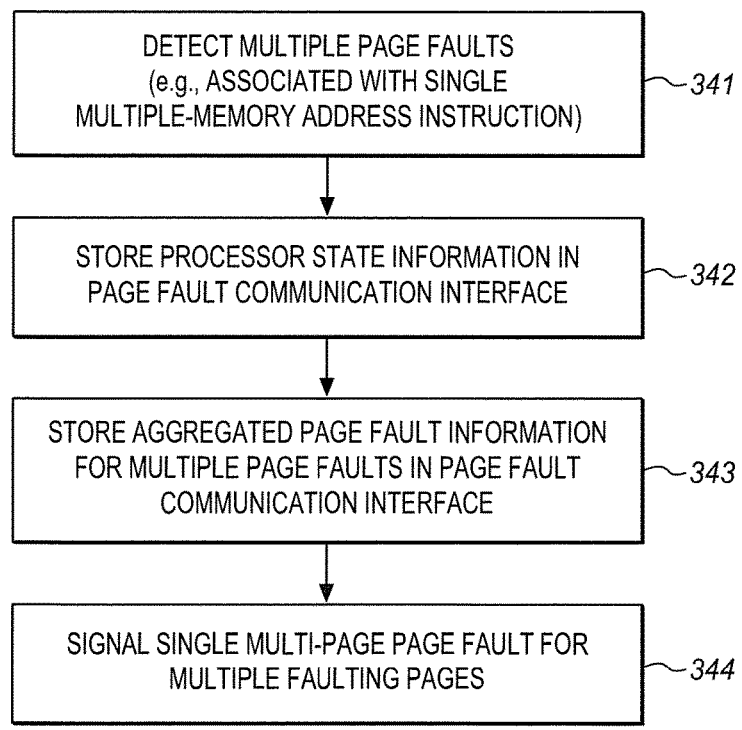
FIG. 3 is a block flow diagram of an example embodiment of a method in a processor for generating a multi-page page fault.

FIG. 3 is a block flow diagram of an example embodiment of a method 340 in a processor for generating a multi-page page fault. In various embodiments, the method may be performed by a general-purpose processor or a special-purpose processor (e.g., a graphics processor). In some embodiments, the method 340 may be performed by the processor 211 of FIG. 2. Alternatively, the method 340 may be performed by a different processor than processor 211. Moreover, the processor 211 may perform embodiments of operations and methods either the same as or different than those of the method 340.

The method includes detecting multiple page faults, at block 341. In some embodiments, the multiple page faults may be associated with a single multiple memory address instruction.

The method includes storing processor state information in a page fault communication interface, at block 342. By way of example, the processor state information may include processor status, processor flags, an instruction pointer, a stack pointer, stack segment information, code segment information, or a combination thereof. In general, any type of processor state information that is conventionally stored for a page fault may be stored. In some embodiments, the page fault communication interface may include a page fault handler stack, a control register, one or more allocated memory locations, memory mapped input/output, or a combination thereof.

The method includes storing aggregated page fault information for multiple page faults in the page fault communication interface, at block 343. In some embodiments, the aggregated page fault information may include multiple memory addresses for multiple corresponding faulting pages. In some embodiments, the aggregated page fault information may include aggregated error code information for multiple faulting pages. In some embodiments, the aggregated error code information may include information common to multiple or all faulting pages (e.g., information pertinent to a multiple memory address instruction which affects each of the memory addresses of the instruction), and information specific to individual ones of the faulting pages.

The method includes signaling a single multi-page page fault for multiple faulting pages, at block 344. In some embodiments, execution of a multiple memory address instruction may be stopped while the operating system handles the aggregated page faults, and then execution of the multiple memory address instruction may resume after the multiple page faults have been handled in a batch with a single fault raised to the operating system and a single associated return from fault from the operating system.

This is just one embodiment of a suitable method. The method has been shown in a basic form, although operations may optionally be added to and/or removed from the method. In addition, although a particular order of the operations has been shown and/or described, alternate embodiments may perform certain operations in different order, combine certain operations, overlap certain operations, etc. For example, the aggregated page fault information may be stored prior to the processor state information.

Figure 4:
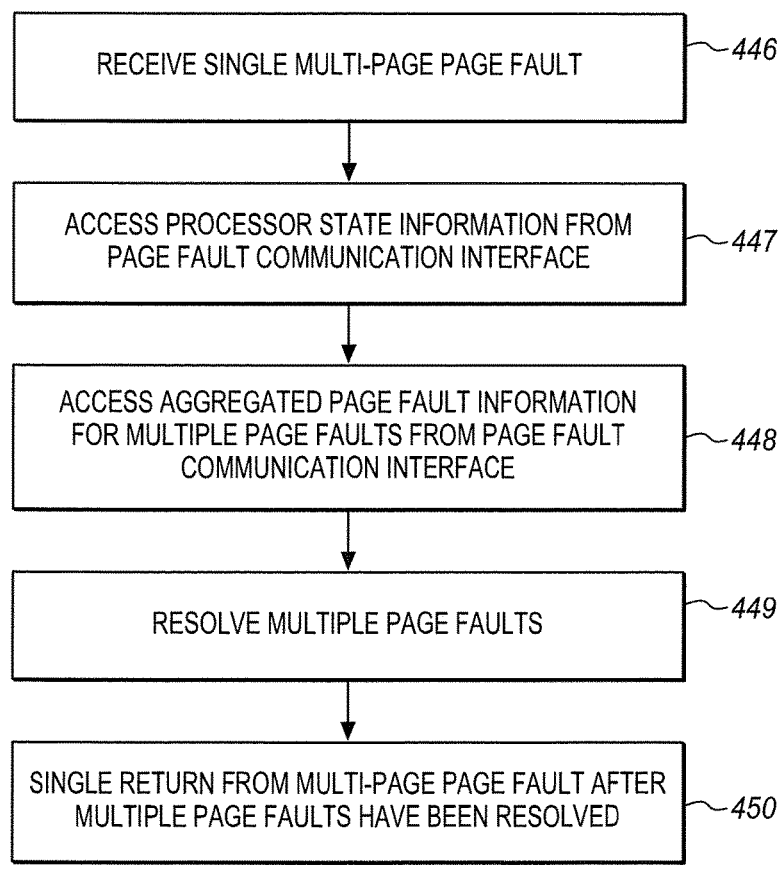
FIG. 4 is a block flow diagram of an example embodiment of a method in a page fault handler module for resolving a multi-page page fault.

FIG. 4 is a block flow diagram of an example embodiment of a method 445 in a page fault handler module for resolving a multi-page page fault. In various embodiments, the method may be performed in a computer system or other electronic device including by executing instructions on a general or special purpose processor. The page fault handler module may be a particular page fault handler module having particular logic to resolve multiple aggregated page faults.

The method includes receiving a multi-page page fault, at block 446. The multi-page page fault may involve multiple pages. In some embodiments, this may include receiving a page fault raised or signaled by a processor or MMU.

The method includes accessing processor state information from a page fault communication interface, at block 447. The processor state information may include the types of information previously mentioned. The page fault communication interface may be as previously described (e.g., a stack, register, memory location, or combination thereof).

The method includes accessing aggregated page fault information for multiple page faults from the page fault communication interface, at block 448. In some embodiments, the aggregated page fault information may include multiple memory addresses for multiple corresponding faulting pages. In some embodiments, the aggregated page fault information may include aggregated error code information for multiple faulting pages. In some embodiments, the aggregated error code information may include information common to multiple or all faulting pages (e.g., information pertinent to a multiple memory address instruction which affects each of the memory addresses of the instruction), and information specific to individual ones of the faulting pages.

The method includes resolving multiple page faults, at block 449. The page fault handler may identify the multiple page addresses associated with the fault. The page fault handler may then determine whether the problem for each of the multiple pages is related to permission attributes associated with the attempted access, or due to the page not being present. By way of example, if the problem is related to permission attributes (e.g., there is a permissions collision), then the permission attributes may be resolved (e.g., a new page may be allocated). As another example, if the problem is due to the page not being present (e.g., the page is not in main memory but is secondary memory), then the page may be retrieved (e.g., the page may be accessed from the secondary memory and stored in the main memory). In some cases, a page may need to be swapped out of main memory to make room. Paging structures and other updates to reflect the change may be performed as conventionally done. This may be repeated for each of the multiple or batch of pages associated with the multi-page page fault.

The method includes a single return from the multi-page page fault after the multiple page faults have been resolved, at block 450. In some embodiments, this may include using an instruction pointer to return execution to a multiple memory address instruction after a number of page faults associated with the multiple memory addresses have been resolved through a single page fault being raised and a single return from the page faults.

This is just one embodiment of a suitable method. The method has been shown in a basic form, although operations may optionally be added to and/or removed from the method. In addition, although a particular order of the operations has been shown and/or described, alternate embodiments may perform certain operations in different order, combine certain operations, overlap certain operations, etc. For example, the aggregated page fault information may be accessed prior to the processor state information.

Figure 5:
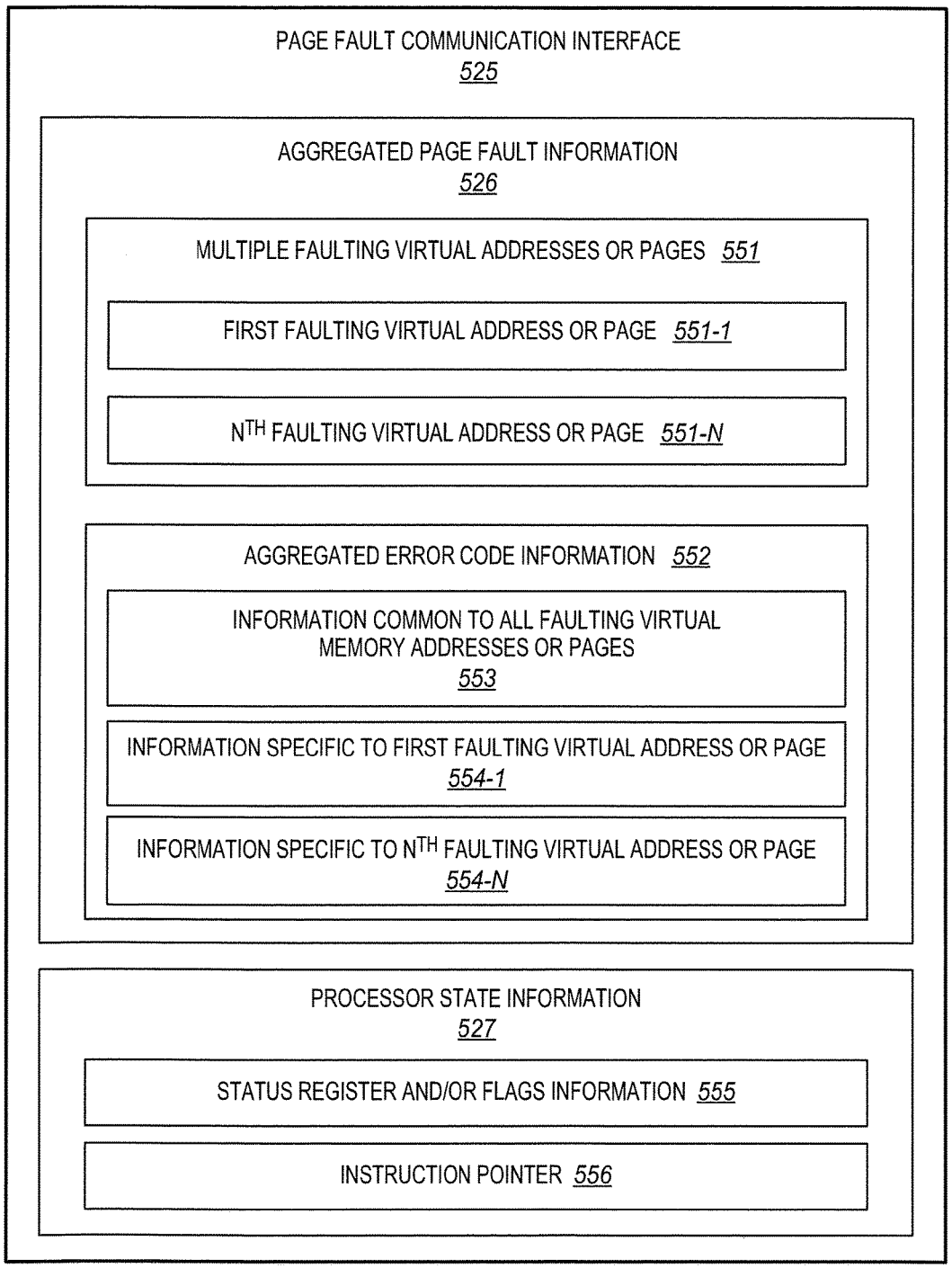
FIG. 5 is a block diagram of an embodiment of a page fault communication interface.

FIG. 5 is a block diagram of an embodiment of a page fault communication interface 525. The page fault communication interface represents an interface used by the processor and the operating system module to exchange information about aggregated page faults. In some embodiments, the page fault communication interface may represent one or more predetermined agreed upon architecturally visible storage locations accessible to both the processor and the operating system. Examples of suitable page fault communication interfaces include, but are not limited to, one or more stacks (e.g., a page fault handler modules stack), one or more registers (e.g., one or more control registers or vector control registers), allocated memory locations, memory-mapped input/output memory locations, and combinations thereof. The scope of the invention is not limited to any known type of page fault communication interface as long as the processor and operating system and/or page fault handler modules are aware of the interface and able to access it as needed to convey the appropriate information.

Aggregated page fault information 526 for multiple faulting pages is stored in the interface. The aggregated page fault information includes multiple faulting virtual memory addresses or pages 551. In the illustration, the multiple faulting virtual memory addresses include a first faulting virtual memory address or page 551-1 and an Nth faulting virtual memory address or page 551-N, where N is at least two. In some embodiments, only the faulting virtual memory addresses may be provided through the interface and/or communicated from the processor to the operating system. Alternatively, in other embodiments, all of the virtual memory addresses (e.g., all of the virtual memory addresses of a multiple memory address instruction) may be provided though the interface and/or communicated from the processor to the operating system, even if they are not faulting. Advantageously, this may allow the operating system module and/or the page fault handler module to ensure that all pages needed by the instruction are available and that access to them is value (e.g., they have the appropriate permission attributes) prior to returning to execution of the instruction. In still other embodiments, all of the virtual memory addresses may be provided though the interface and/or communicated from the processor to the operating system even if they are not faulting and a subset of faulting virtual memory addresses may be distinguished from non-faulting virtual memory addresses. The faulting and non-faulting virtual memory addresses may be distinguished from one another in various different ways, such as, for example, by setting or clearing a bit associated with one or more of the faulting and non-faulting virtual memory addresses or otherwise marking one or more of them.

The aggregated page fault information also includes aggregated error code information 552. In the illustration, the aggregated error code information includes information 553 common to all faulting virtual memory addresses or pages (in some cases to all virtual memory addresses or pages), information 554-1 specific or particular to the first faulting virtual memory address or page, and information 554-N specific or particular to the Nth faulting virtual memory address or page. By way of example, the information common to all of the faulting virtual memory addresses may include information to specify whether the access causing the fault was a read (e.g., in the case of a gather instruction) or a write (e.g., in the case of a scatter instruction), whether or not the fault was caused by an instruction fetch, whether the access causing the fault originated when the processor was executing in privileged (e.g., supervisor) or non-privileged (e.g., user) mode, etc., which may be common to all virtual memory addresses associated with a given multiple memory address instruction.

By contrast, the information specific or particular to a given faulting virtual memory address may include information to specify whether or not the fault was caused by a non-present page, whether or not the fault was caused by a page-level protection violation, whether or not the fault was caused by a reserved bit violation, etc, which may all be specific to a given faulting virtual memory address. That is, some of the information may be specified per faulting virtual memory address. In this embodiment, a portion of the information common to all of the faulting virtual memory addresses only needs to be stored once, and only information specific or particular to each faulting virtual memory address needs to be stored for each faulting virtual memory address. Alternatively, in other embodiments, all information may be stored for each faulting virtual memory address, although this may take up more space.

Processor state information 527 is also stored in the interface. The illustrated processor state information includes a status register and/or flags 555 and an instruction pointer 556.

FIG. 6 is a block diagram of a particular example embodiment of a page fault handler modules stack 625 having aggregated page fault information 626 and processor state information 627. The page fault handler modules stack may represent an allocated portion of main memory. The stack may represent a last in, first out (LIFO) linear data structure or linear list of information in which additions and deletion are made from one end referred to as the top of the stack. The stack may be accessed by specific commands or operations, such as, for example, push and pop. A push operation may add a new piece of information to the top of the stack. A pop operation may remove an item from the top of the stack. Alternatively, other types of data structures besides stacks may optionally be used. The processor may push the illustrated information onto the stack and the operating system module or page fault handler module may pop the illustrated information from the stack.

The stack includes processor state information 627. As shown, in the illustrated embodiment, the processor state information may include a stack segment register (e.g., SS) 657, a stack pointer register (e.g., ESP) 658, a status register (e.g., EFLAGS) 659, a code segment register (e.g., CS) 660, and an instruction pointer register (e.g., EIP) 661. This is just one example embodiment of possible processor state information, and the scope of the invention is not limited to this particular processor state information. In other embodiments, some of this information may optionally be omitted, additional information may optionally be added, and moreover the order of the information may optionally be rearranged.

The stack also includes aggregated page fault information 626. As shown, in the illustrated embodiment, the aggregated page fault information includes aggregated error code information 652 for multiple faulting pages, an indication of the number of pages 662 (e.g., the total number of pages or the total number of faulting pages), multiple virtual memory addresses or pages 651 including a first virtual memory address or page 651-1 and an Nth virtual memory address 651-N or page (e.g., all virtual memory addresses of an instruction or only faulting virtual memory addresses), and an indication of which pages are faulting pages 663. This is just one example embodiment of possible aggregated page fault information, and the scope of the invention is not limited to this particular aggregated page fault information. In other embodiments, some of this information may optionally be omitted, additional information may optionally be added, and moreover the order of the information may optionally be rearranged. Still further, some of this information may be combined. For example, the indication of which pages are faulting and/or the number of pages may optionally be combined into the aggregated error code information. In other embodiments, instead of specifying the number of pages the number of faulty regions could alternatively be specified.

FIG. 7 is a block diagram of a particular example embodiment of a suitable aggregated error code for multiple faulting pages 752. The aggregated error code includes M-bits.

By way of example, M may be 32-bits, 64-bits, 128-bits, etc. Aggregated error code information for up to N page faults may be represented. In the illustration, P-N represents a per-page bit having a value of 0 to indicate that the fault for page N was caused by a non-present page, or a value of 1 to indicate that the fault for page N was caused by a page-level protection violation. W/R represents a single bit having a value of 0 to indicate that the access causing the fault was a read (R), or a value of 1 to indicate that the access causing the fault was a write (W). U/S represents a single bit having a value of 0 to indicate that the access causing the fault originated when the processor was executing in supervisor mode (S), or a value of 1 to indicate that the access causing the fault originated when the processor was executing in user mode (U). RSVD-N represents a per-page bit having a value of 0 to indicate that the fault for page N was not caused by a reserved bit violation, or a value of 1 to indicate that the fault for page N was caused by a reserved bit set to 1 in some paging-structure entry. I/D represents a single bit having a value of 0 to indicate that the access causing the fault was not caused by an instruction fetch, or a value of 1 to indicate that the access causing the fault was caused by an instruction fetch. AG represents a single bit having a value of 0 to indicate that a non-aggregating page fault handling procedure (e.g., a conventional procedure as described in the background section) is to be used to handle page faults, or a value of 1 to indicate that an aggregating page fault handling procedure as disclosed herein is to be used to handle page faults. This bit allows the aggregating page fault handling procedure disclosed herein to be enabled or disabled. A particular illustrative example of the order of bits within the aggregate error code is shown, although this is only illustrative and is not required. In alternate embodiments, these bits may be arranged differently.

Figure 8:
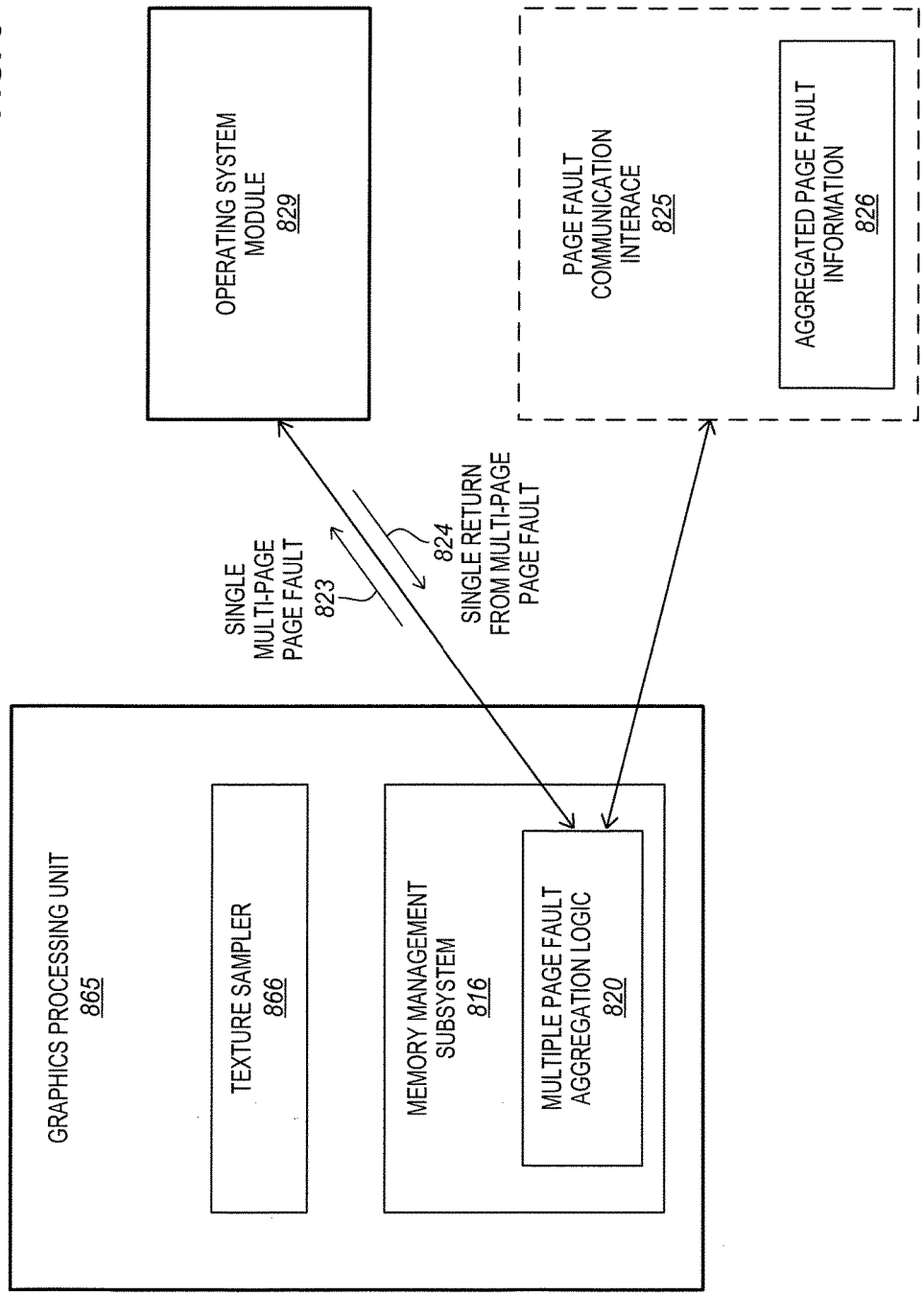
FIG. 8 is a block diagram of a graphics processing unit (GPU) having a texture sampler and a memory management subsystem including a multiple page fault aggregation logic.

FIG. 8 is a block diagram of a graphics processing unit (GPU) 865 having a texture sampler 866 and a memory management subsystem 816 including multiple page fault aggregation logic 820. The texture sampler may retrieve samples from an image, process the samples, and store results of the processing. The sampling of the textures from the image may incur multiple page faults. The multiple page fault aggregation logic may aggregate information about the multiple page faults and store aggregated page fault information 826 in a page fault communication interface 825. The multiple page fault aggregation logic may then signal or raise a single multi-page page fault to an operating system module 829. The operating system module and/or a page fault handler module thereof may resolve the multiple page faults and cause a single return from the multi-page page fault once the multiple page faults have been resolved. In the illustrated embodiment, the memory management subsystem (e.g., an MMU and other components) are shown to be located on the GPU (e.g., on-die with one or more cores of the GPU), although in other embodiments the memory management subsystem or a portion thereof having the multi-page fault aggregation logic may be located off the GPU (e.g., as a standalone component or as part of a general-purpose processor).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension.

An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor with Integrated Memory Controller and Graphics

Figure 11:
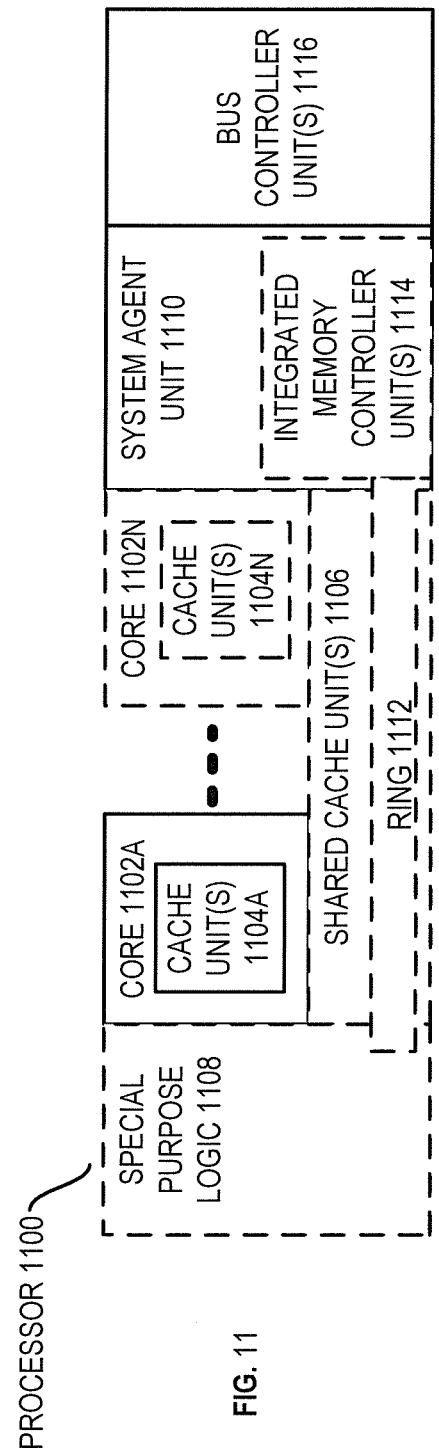
FIG. 11 is a block diagram of a processor 1100 that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
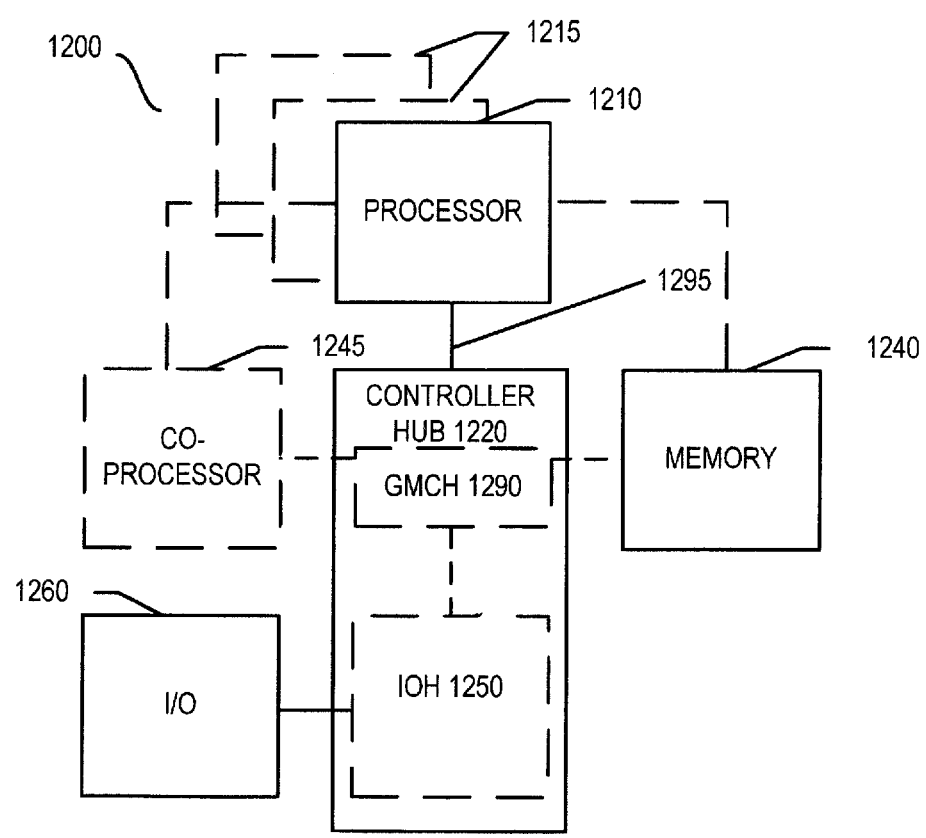
FIG. 12 shown is a block diagram of a system 1200 in accordance with one embodiment of the present invention.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
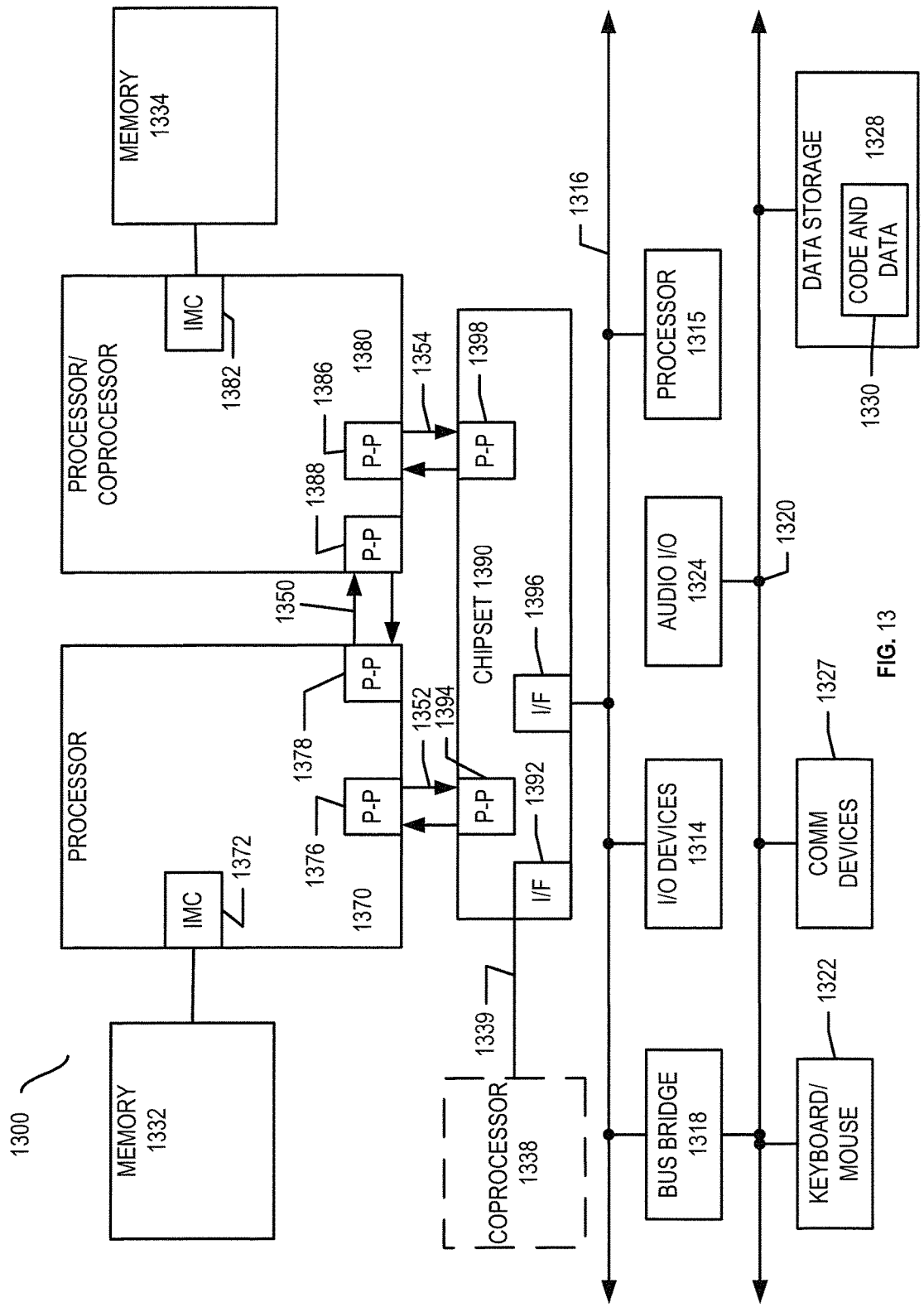
FIG. 13, shown is a block diagram of a first more specific exemplary system 1300 in accordance with an embodiment of the present invention.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
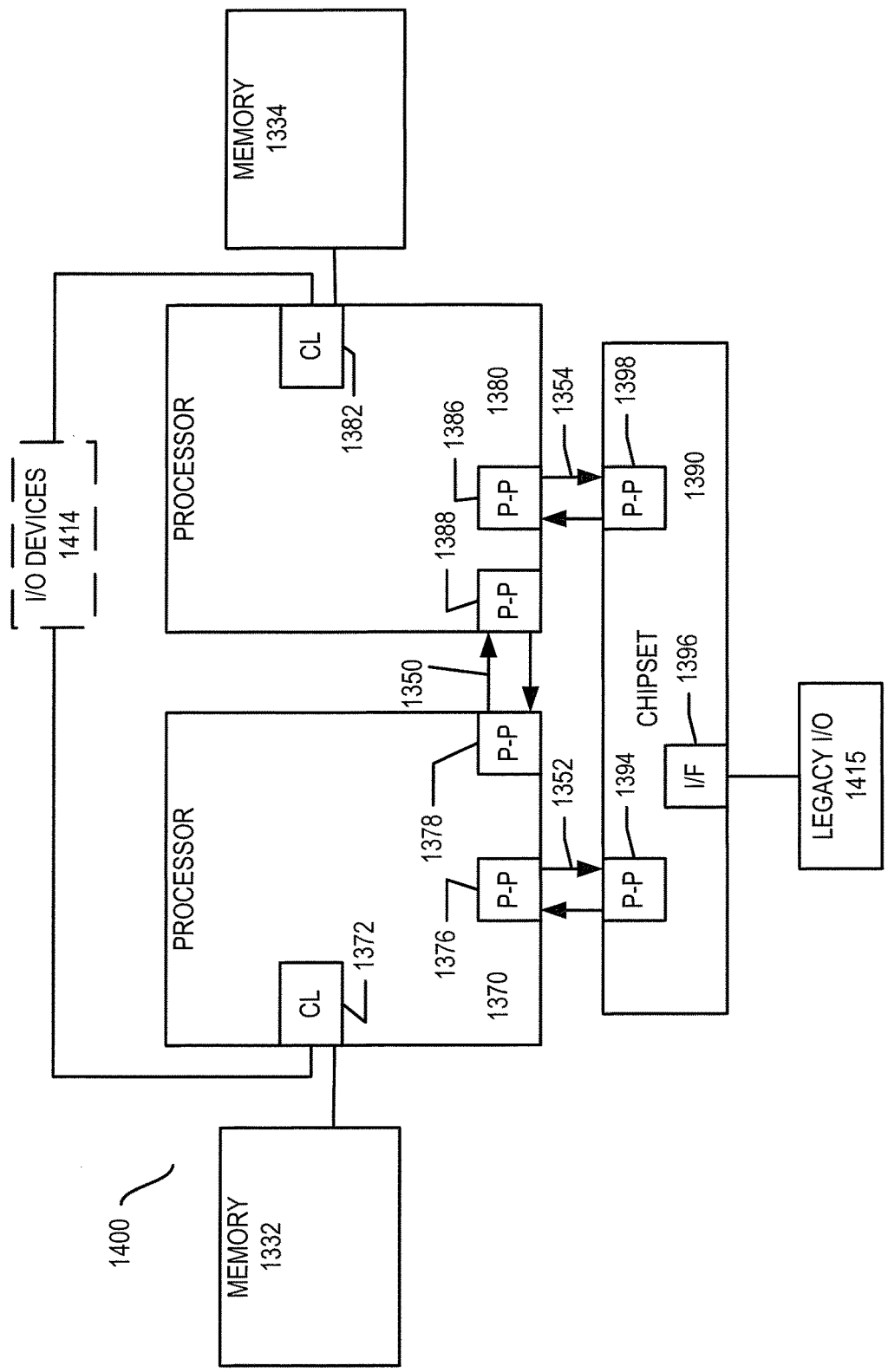
FIG. 14, shown is a block diagram of a second more specific exemplary system 1400 in accordance with an embodiment of the present invention.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
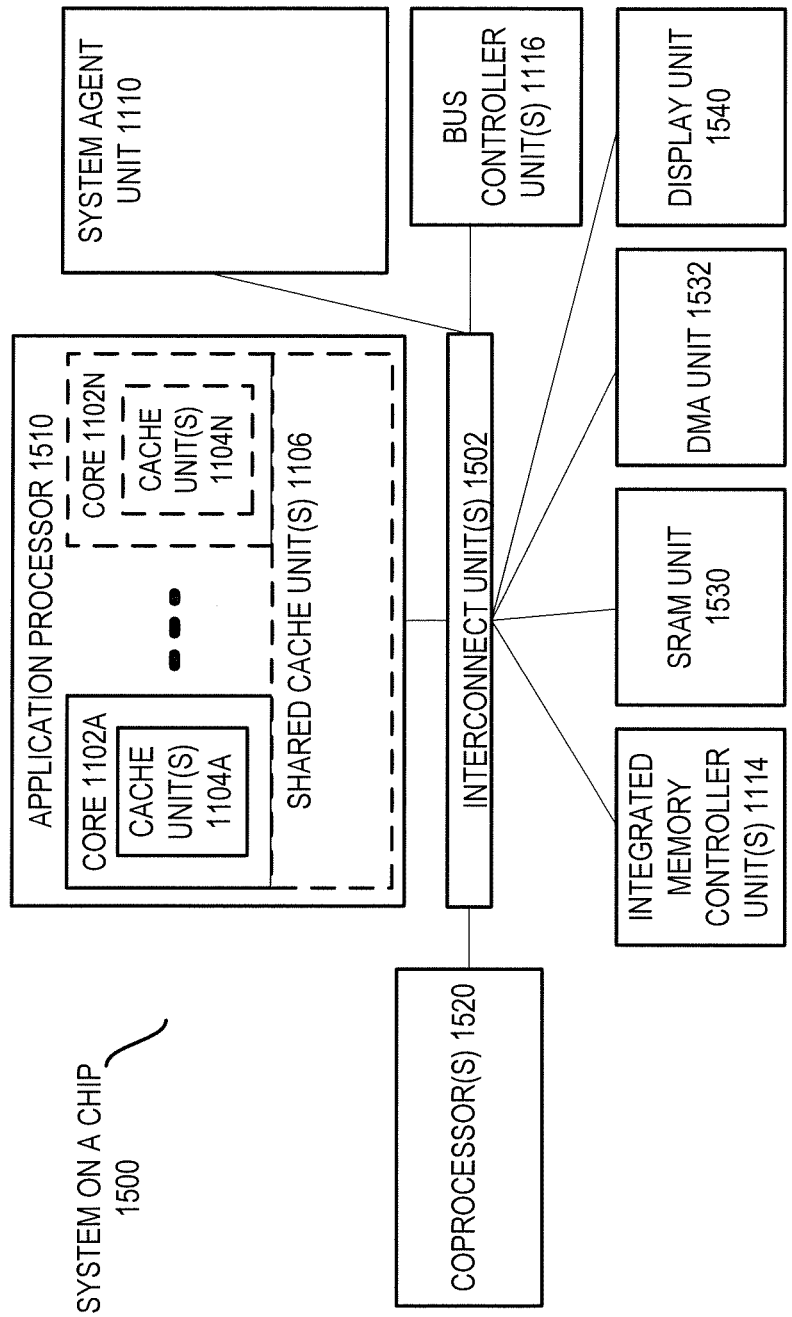
FIG. 15, shown is a block diagram of a SoC 1500 in accordance with an embodiment of the present invention.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

In the description and claims, the terms "coupled" and/or "connected," along with their derivatives, have be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, a memory management subsystem may be coupled with a register or memory location through one or more intervening components. In the figures, arrows are used to show couplings and/or connections.

In the description and claims, the term "logic" may have been used. As used herein, the term logic may include hardware, firmware, software, or various combinations thereof. Examples of logic include integrated circuitry, application specific integrated circuits, analog circuits, digital circuits, programmed logic devices, memory devices including instructions, etc. In some embodiments, the logic may include transistors and/or gates potentially along with other circuitry components.

In the description above, specific details have been set forth in order to provide a thorough understanding of the embodiments. However, other embodiments may be practiced without some of these specific details. The scope of the invention is not to be determined by the specific examples provided above but only by the claims below. All equivalent relationships to those illustrated in the drawings and described in the specification are encompassed within embodiments. In other instances, well-known circuits, structures, devices, and operations have been shown in block diagram form or without detail in order to avoid obscuring the understanding of the description. Where multiple components have been shown and described, in some cases they may be incorporated into one component. Where a single component has been shown and described, in some cases this single component may be separated into two or more components.

Certain methods disclosed herein have been shown and described in a basic form, although operations may optionally be added to and/or removed from the methods. In addition, a particular order of the operations may have been shown and/or described, although alternate embodiments may perform certain operations in different order, combine certain operations, overlap certain operations, etc.

Embodiments pertain to an article of manufacture (e.g., a computer program product) including a machine-readable storage medium storing a sequence of instructions (e.g., one or more routines or other portions of programs). The sequence of instructions, if executed by a machine, is operable to cause the machine to perform one or more operations or methods as disclosed herein. In some embodiments, the machine-readable storage medium may be a tangible and/or non-transitory machine-readable storage medium.

In various example embodiments, the machine-readable storage medium may include a floppy diskette, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a semiconductor memory, other types of memory, or a combinations thereof. In some embodiments, the medium may include one or more solid data storage materials, such as, for example, a semiconductor data storage material, a phase-change data storage material, a magnetic data storage material, an optically transparent solid data storage material, etc.

Examples of different types of machines include, but are not limited to, processors (e.g., general-purpose processors and special-purpose processors), instruction processing apparatus, and various electronic devices having one or more processors or instruction processing apparatus. A few representative examples of such electronic devices include, but are not limited to, computer systems, desktops, laptops, notebooks, servers, network routers, network switches, nettops, set-top boxes, cellular phones, video game controllers, etc.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

What is claimed is:

1. A processor comprising:
an instruction pipeline to process a multiple memory address instruction that is to indicate multiple memory addresses; and
multiple page fault aggregation logic, of a memory management subsystem of the processor that includes a memory management unit (MMU) and that is coupled with the instruction pipeline and implemented in one of hardware of the memory management subsystem of the processor, firmware of the memory management subsystem of the processor, microcode of the memory management subsystem of the processor, and a combination thereof, the multiple page fault aggregation logic to aggregate page fault information for multiple page faults that are each associated with one of the multiple memory addresses of the instruction, wherein the page fault information is to be aggregated prior to informing an operating system of any of the multiple page faults, and wherein the multiple memory addresses are to correspond to multiple non-contiguous memory locations, the multiple page fault aggregation logic of the memory management subsystem of the processor to provide the aggregated page fault information to a page fault communication interface that is to be used by the processor to exchange information with the operating system.

2. The processor of claim 1, wherein the processor is to raise a single multi-page page fault to the operating system for the multiple page faults.

3. The processor of claim 2, wherein the processor is to receive a single return from the multi-page page fault from the operating system for the multiple page faults.

4. The processor of claim 1, wherein the multiple page fault aggregation logic is to provide multiple faulting addresses, which each corresponding to one of the multiple page faults, to the page fault communication interface.

5. The processor of claim 1, wherein the multiple page fault aggregation logic is to provide aggregated error code information for the multiple page faults to the page fault communication interface.

6. The processor of claim 5, wherein the aggregate error code information comprises first error code information specific to a first page fault of the multiple page faults and second error code information specific to a second page fault of the multiple page faults.

7. The processor of claim 1, wherein the multiple page fault aggregation logic is to provide a number of the multiple page faults to the page fault communication interface.

8. The processor of claim 1, wherein the multiple page fault aggregation logic is part of a memory management subsystem of the processor and comprises circuitry.

9. A method in a processor comprising:
detecting multiple page faults corresponding to multiple non-contiguous memory locations;

aggregating page fault information for the multiple page faults, prior to informing an operating system of any of the multiple page faults, with on-die logic of a memory management subsystem of the processor that includes a memory management unit (MMU) and a translation lookaside buffer (TLB) and that comprises one of hardware of the memory management subsystem of the processor, firmware of the memory management subsystem of the processor, microcode of the memory management subsystem of the processor, and a combination thereof;

providing aggregated page fault information for the multiple page faults from the processor to a page fault communication interface, which includes at least one of (1) a stack and (2) at least one register, that is used to provide information from the processor to the operating system; and signaling a single multi-page page fault for the multiple page faults from the processor to the operating system after the aggregation of the page fault information.

10. The method of claim 9, further comprising receiving a multiple memory address instruction indicating multiple memory addresses, and wherein detecting the multiple page faults comprises detecting multiple page faults that each correspond to one of the multiple memory addresses indicated by the instruction.

11. The method of claim 9, further comprising receiving a single return from the multi-page page fault.

12. The method of claim 9, wherein providing the aggregated page fault information comprises storing the aggregated page fault information in at least one of a register and a stack.

13. The method of claim 9, wherein providing the aggregated page fault information comprises providing multiple faulting addresses, which each correspond to one of the multiple page faults, to the page fault communication interface.

14. The method of claim 9, wherein providing the aggregated page fault information comprises providing aggregated error code information for the multiple page faults to the page fault communication interface.

15. The method of claim 14, wherein providing the aggregated error code information comprises providing a first error code information that is specific to a first page fault of the multiple page faults and a second error code information that is specific to a second page fault of the multiple page faults.

16. The method of claim 15, wherein providing the aggregated error code information comprises providing information that is common to all of the multiple page faults only once.

17. The method of claim 9, wherein providing the aggregated page fault information comprises providing a number of the multiple page faults to the page fault communication interface.

18. An article of manufacture comprising:
a non-transitory machine-readable storage medium, the machine-readable storage medium storing a sequence of instructions that if executed by a machine are operable to cause the machine to perform operations comprising,
receiving, at an operating system, a single multi-page page fault that has been signaled by a processor;
accessing aggregated page fault information for multiple page faults associated with the multi-page page fault from a page fault communication interface that is to be used to exchange the aggregated page fault information between a memory management subsystem of a processor and the operating system, wherein the multiple page faults associated with the multi-page page fault are to correspond to multiple non-contiguous memory locations; and
provide a single return from the single multi-page page fault after the multiple page faults have been resolved.

19. The article of manufacture of claim 18, wherein the machine-readable storage medium further stores instructions that if executed are operable to cause the machine to perform operations comprising resolving the multiple page faults between receiving the single multi-page page fault and providing the single return.

20. The article of manufacture of claim 18, wherein the machine-readable storage medium further stores instructions that if executed are operable to cause the machine to perform operations comprising accessing multiple faulting addresses, which each correspond to one of the multiple page faults, from the page fault communication interface.

21. The article of manufacture of claim 18, wherein the machine-readable storage medium further stores instructions that if executed are operable to cause the machine to perform operations comprising accessing aggregated error code information for the multiple page faults from the page fault communication interface.

22. The article of manufacture of claim 21, wherein the machine-readable storage medium further stores instructions that if executed are operable to cause the machine to perform operations comprising accessing a first error code information that is specific to a first page fault of the multiple page faults and accessing a second error code information that is specific to a second page fault of the multiple page faults.

23. The article of manufacture of claim 21, wherein the machine-readable storage medium further stores instructions that if executed are operable to cause the machine to perform operations comprising accessing information that is common to all of the multiple page faults only once from the page fault communication interface.

24. The article of manufacture of claim 18, wherein the machine-readable storage medium further stores instructions that if executed are operable to cause the machine to perform operations comprising accessing a number of the multiple page faults from the page fault communication interface.

25. A system comprising:
an interconnect;
a processor coupled with the interconnect, the processor including a memory management subsystem having a memory management unit and multiple page fault aggregation logic, the multiple page fault aggregation logic implemented in one of hardware of the memory management subsystem of the processor, firmware of the memory management subsystem of the processor, microcode of the memory management subsystem of the processor, and a combination thereof, the multiple page fault aggregation logic to aggregate page fault information for multiple page faults, wherein the page fault information is to be aggregated prior to informing an operating system of any of the multiple page faults, and wherein the multiple page faults are to correspond to multiple non-contiguous memory locations, the multiple page fault aggregation logic to provide the aggregated page fault information to a page fault communication interface, which is to include at least one of (1) a stack and (2) at least one register, that is to be used by the processor to exchange information with the operating system, the processor to signal a single multi-page page fault after the aggregation of the page fault information; and a dynamic random access memory (DRAM) coupled with the interconnect, the DRAM storing a sequence of instructions that if executed by the system are operable to cause the system to perform operations comprising:

receive the single multi-page page fault that was signaled by the processor;

access the aggregated page fault information from the page fault communication interface; and provide a single return from the single multi-page page fault after the multiple page faults have been resolved.

26. The system of claim 25, wherein the multiple page fault aggregation logic is to provide multiple faulting addresses, which each corresponding to one of the multiple page faults, to the page fault communication interface.

27. The system of claim 25, wherein the multiple page fault aggregation logic is to provide aggregated error code information for the multiple page faults to the page fault communication interface, wherein the aggregate error code information comprises first error code information specific to a first page fault of the multiple page faults and second error code information specific to a second page fault of the multiple page faults.

* * * * *

UNITED STATES PATENT AND TRADEMARK OFFICE
CERTIFICATE OF CORRECTION

PATENT NO. : 9,891,980 B2  
APPLICATION NO. : 13/977106  
DATED : February 13, 2018  
INVENTOR(S) : Boris Ginzburg et al.

Page 1 of 1

It is certified that error appears in the above-identified patent and that said Letters Patent is hereby corrected as shown below:

On the Title Page

In item (54), and in the Specification in Column 1, in "Title", Line 2, delete "HANDLINE" and insert -- HANDLING --, therefor.

In the Drawings

On sheet 2 of 16, in Figure 2, reference numeral 225, Line 3, delete "INTERACE" and insert -- INTERFACE --, therefor.

Signed and Sealed this  
Twenty-seventh Day of March, 2018

Andrei Iancu  
*Director of the United States Patent and Trademark Office*